(12) United States Patent
Yoshida et al.

(10) Patent No.: US 6,819,689 B2
(45) Date of Patent: Nov. 16, 2004

(54) PASSIVE MODE LOCK FIBER LASER

(75) Inventors: Makoto Yoshida, Aichi-ken (JP); Shinichi Harada, Aichi-ken (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 0 days.

(21) Appl. No.: 10/165,979

(22) Filed: Jun. 11, 2002

(65) Prior Publication Data

US 2002/0196815 A1 Dec. 26, 2002

(30) Foreign Application Priority Data

Jun. 12, 2001 (JP) .................................... 2001-177749

(51) Int. Cl.[7] ................................................ H01S 3/30
(52) U.S. Cl. ................................ 372/6; 372/18; 372/34
(58) Field of Search .......................... 372/6, 18, 33–36

(56) References Cited

U.S. PATENT DOCUMENTS

| | | | |
|---|---|---|---|
| 5,181,214 A | * | 1/1993 | Berger et al. .................. 372/34 |
| 6,097,741 A | * | 8/2000 | Lin et al. ........................ 372/6 |
| 6,567,438 B2 | * | 5/2003 | Lin ............................... 372/34 |

FOREIGN PATENT DOCUMENTS

JP  08 051246 A  2/1996

OTHER PUBLICATIONS

Optronics (2001) No. 4, 232, pp. 153–157, published Apr. 10, 2001.

"Synchronization of Environmenatlly Coupled, Passively Mode–locked Fiber Lasers", G. Suicha et al., Optics Letters, vol. 21, No. 19, Oct. 1, 1996.

* cited by examiner

Primary Examiner—Don Wong
Assistant Examiner—Leith Al-Nazer
(74) Attorney, Agent, or Firm—Sughrue Mion, PLLC

(57) ABSTRACT

A passive mode lock fiber laser including an energy generating means. The energy generating means includes a cavity, the cavity includes a gain medium made of an optical fiber for amplifying the laser energy in the cavity, a reflect means for reflecting the laser energy, a phase fluctuation compensating means for compensating a linear phase fluctuation of the gain medium, and an output means for outputting the laser energy generated in the cavity includes a temperature adjusting mechanism for adjusting a temperature of an optical fiber portion and a piezo element position adjusting mechanism for adjusting a position in the optical axis of the reflect means by using a piezo element.

5 Claims, 5 Drawing Sheets

PASSIVE MODE LOCK FIBER LASER

CROSS REFERENCE TO RELATED APPLICATIONS

This application is based on and claims priority under 35 U.S.C. §119 with respect to Japanese Patent Application 2001-177749, filed on Jun. 12, 2001, the entire content of which is incorporated herein by reference.

FIELD OF THE INVENTION

This invention relates to a passive mode lock fiber laser for generating ultra-short light pulses, which is stable against environment temperature change.

BACKGROUND OF THE INVENTION

Conventionally, for example, a passive mode lock fiber laser is disclosed in Japanese patent laid open publication No. 1996-51246, the passive mode lock fiber laser includes a compensating means for compensating a linear phase fluctuation in a laser cavity and a gain medium, which is difficult received an effect against an environment temperature fluctuation. An embodiment of the passive receiving mode lock fiber laser is disclosed in an optronics 2001. 4 No. 232, pages 153–157 (published on Apr. 10, 2001), which is constructed by Fably-Perot type laser cavity. Concretely, each Faraday rotator which rotates a deflection surface is disposed at a vicinity of both ends of the laser cavity, thereby it is able to obtain a stable liner phase delay between two deflection intrinsic modes when a laser transmits in the optical fiber and interferes with each other therein, and it is able to maintain a stable mode lock condition against the environment temperature change.

However, a repetition frequency is primarily determined by effective length of the laser cavity in the above-mentioned passive mode lock fiber laser. The effective length of the laser cavity fluctuates by the environment temperature change. This is, a portion composing of materials except the optical fiber in the cavity (e.g. base member etc. mounting and fixed with optical parts (e.g. a focus lens, a mirror e.t.c) are composed of metal materials in addition to be occurred an expansion and contraction by the environment temperature change in the optical fiber itself. Generally, compared with glass materials constituting the optical fiber on a linear expansion coefficient, metal materials are larger single digit than glass materials, thereby the expansion and contraction occurs at a portion constituting by the material except the optical fiber. Accordingly, the repetition frequency of the above mentioned fiber laser fluctuates by the environment temperature change.

Actually, in the above-mentioned construction, FIG. 5 shows an embodiment which measured timely transition of the repetition frequency fluctuation under an environment in a generally laboratory when the repetition frequency of the laser is adjusted at, about 50 MHz. In FIG. 5, an abscissa axis indicates hour, and an ordinate axis indicates repetition frequency (KHz) and room temperature (°C.). According to the measured result shown in FIG. 5, when the room temperature fluctuates about 7° C., FIG. 5 shows that the repetition frequency fluctuates by 3 KHz. In variable fields of recent industrial world, under increasing demand of the laser of which is able to maintain a stable mode lock condition against the environment temperature change and it is able to output a constant repetition frequency against the environment temperature change, the laser of which the repetition frequency fluctuates by 3 KHz when the room temperature fluctuates about 7° C., in the industrial field of which the laser is applied, as a fluctuation width of the repetition frequency is larger, the laser is not able to use in the industrial field. Otherwise, the laser is not able to use for experiments etc. spent a long time even if the laser is used, and use of the laser is restricted only experiment within a short time under a condition of which the environment temperature change and the fluctuation of the repetition frequency are little.

Further, the above mentioned passive mode lock fiber laser is disclosed in 1570 OPTICS LETTERS/Vol. 21, No. 19/Oct. 1, 1996, which is a constitution of which a position in an optical axis direction of one of mirrors disposed at both end portions of the laser cavity is adjusted by using piezo-electric element (piezo element) so as to actively adjust the cavity length and the repetition frequency. The fiber laser measures a difference between the master laser and the slave laser on the repetition frequency, the fiber laser controls the piezo element in a direction of which the difference of the repetition frequency is decreased by a feedback electronic circuit so as to correspond a repetition frequency of a slave laser adjustable by using the piezo element for the position in the optical axis of one of the mirrors with same frequency based on a fluctuation of a repetition frequency of other laser (e.g. master laser) of which a position control of the mirror is not executed by using the piezo element.

Further, the environment temperature changes of both lasers make same degree by winding an optical fiber constructing the master laser and an optical fiber constructing the slave laser for a same fiber spool, thereby the difference of repetition frequency of the both lasers is suppressed a minimum level. Generally, as a position movable area moving by piezo element is less or equal few hundred micron ($\mu$), when the difference of the repetition frequency of the both lasers is greater, it is beyond the movable area of the piezo element. As a result, the repetition frequency of the slave laser is not able to correspond with the repetition frequency of the master laser.

However when an absolutely independent laser pulse signal or electric signals or the like are measured in many application fields using the passive mode lock fiber laser, there is a demand which want to stable against the repetition frequency of the laser under a condition generating the repetition frequency including a fluctuation width larger than the environment temperature change. On this case, it is not able to correspond to only adjustment by the above mentioned piezo element. For example, as the above-mentioned embodiment, when environmental temperature fluctuates by 7° C., and when a laser fluctuating the repetition frequency by 3 KHz is disposed under a condition of which environment temperature fluctuates about 50° C., the repetition frequency fluctuates about 21 KHz. Hereupon, a calculation formula of which change the repetition frequency to a fluctuation of the cavity width shows hereinafter. When a laser cavity length defines L (m), a light velocity defines c (m/s), an effective refraction factor defines n, a repetition frequency C (Hz) defines $C=c/(2\,nL)$. If a refractive index of air defines '1', when the fluctuation width of the cavity width corresponding to the repetition frequency fluctuation by 21 KHz according to the formula is calculated, the fluctuation width thereof results in 1.26 mm. The calculation result means that a necessary fluctuation width of the cavity length needed so as to absorb the repetition frequency fluctuation (21 KHz) is 1.26 mm. When the environment temperature change as this like is large, it is beyond the adjustable area (movable area) by adjusting a position of the mirror using the piezo element which is less than few hundred micron results in an out of adjusting area, thereby it is not stable against the repetition frequency of the laser.

SUMMARY OF THE INVENTION

In view of the foregoing, it is an object of the present invention to provide a passive mode lock fiber laser of which mode lock is maintained under a stable condition against environment temperature change, and which is easy to stable adjust against a repetition frequency under a condition of which environment temperature change is, large.

According to a first aspect of the present invention, a passive mode lock fiber laser including an energy generating means for generating a laser energy with a cavity including a gain medium made of an optical fiber for amplifying the laser energy in the cavity, a reflect means for reflecting the laser energy along an optical axis passing through the gain medium, a phase fluctuation compensating means for compensating a linear phase fluctuation of the gain medium, and an output means for outputting the laser energy generated in the cavity includes a temperature adjusting mechanism for adjusting a temperature of an optical fiber portion, and a piezo element position adjusting mechanism for adjusting a position in the optical axis of the reflect means by using a piezo element.

Thereby, the passive mode lock fiber laser includes the piezo element position adjusting mechanism for adjusting the position of the light axis direction of the reflect means by using the piezo element and further includes at least the temperature adjusting mechanism for adjusting the temperature of the optical fiber portion. Accordingly, under the condition of which the environment temperature change is large, the optical fiber portion is difficult to receive effects caused by the environment temperature change. Further, as the fluctuation width of the temperature at the optical fiber portion is at least decreased, the fluctuation width caused by the environment temperature change of the cavity length decreases. Thereby, using the temperature adjusting mechanism, the fluctuation width caused by environment temperature change of the cavity length is able to suppress within an adjusting area of the cavity length (less than few hundred micron) by the piezo element position adjusting mechanism under the condition of which the environment temperature change is large. Then, a fine adjustment of the cavity length is performed by fine adjusting the position in the optical axis direction of the reflect means by the piezo element position adjusting mechanism. According to the present invention, the passive mode lock fiber laser can be surely maintain the cavity length under a certain condition, which is able to stable generate a requested repetition frequency even if the environment temperature change is large. Further, the temperature adjusting mechanism may be adjust a temperature at the optical fiber portion, which further adjusts the temperature at a portion (e.g. base member fixed with optical parts (e.g. focus lens, mirror etc.) consisting of materials except the optical fiber in the cavity.

The above-mentioned temperature adjusting mechanism may be include a heater disposed at vicinity of the optical fiber portion, and include Peltier element disposed at the vicinity of the optical fiber. Thereby, the temperature adjusting mechanism can be established by a simply construction. By the way, when the heater is used, a set temperature of the heater is preferred set more than the room temperature. Further, when the Peltier element is used, the set temperature is preferable set at a close temperature for a room temperature.

Further, according to a second aspect of the present invention, a passive mode lock fiber laser including an energy generating means for generating a laser energy with a cavity including a gain medium made of an optical fiber for amplifying the laser energy in the cavity, a reflect means for reflecting the laser energy along an optical axis passing through the gain medium, a phase fluctuation compensating means for compensating a linear phase fluctuation of the gain medium, and an output means for outputting the laser energy generated in the cavity includes a mechanical position adjusting mechanism for mechanically adjusting a cavity length of the cavity and a piezo element position adjusting mechanism for adjusting a position in the optical axis of the reflect means by using a piezo element.

Hereupon, the mechanical position adjusting mechanism does not include a mechanism using physical characteristics (e.g. expansion and contraction) such as the piezo element position adjusting mechanism, for example, the mechanical position adjusting mechanism means a mechanical mechanism so as to spatially and relatively be able to move mechanical position adjusting mechanism for other components in the present laser.

Thereby, under the condition of which the environment temperature, change is large, even if the fluctuation of the cavity length based on the expansion and contraction caused by the environment temperature change at the optical fiber portion and the portion consisting of materials except the optical fiber portion in the cavity occurs, the cavity length is suppressed within the adjusting area (less or equal few hundred micron) by using of the mechanical position adjusting mechanism, then the fine adjustment of the cavity length can be performed by the fine adjusting the position in the optical axis direction of the reflect means by the piezo element position adjusting mechanism. That is, the temperature adjusting mechanism for rough adjusting the cavity length corresponds to 'mechanical position adjusting mechanism' in the above-mentioned invention. Accordingly, as the cavity length is able to securely maintain certain length under the condition of which the environment temperature change is large in the present invention, it is provided a passive mode lock fiber laser of which the requested repetition frequency is generated under a stable condition.

By the way, the mechanical position adjusting mechanism may be constructed by a movable moving member in the optical direction mounting the reflect means and the piezo element position adjusting mechanism, herewith as a position of the moving member in the optical direction is controlled, it is easy the position thereof to relatively move for another construction element of the laser, it is able to more easy rough adjust the cavity length.

BRIEF DESCRIPTION OF THE DRAWINGS

The features and advantages of an displacement detecting device according to the present invention, and others, will be more clearly appreciated from the following description considered in conjunction with the accompanying drawing figures in which like elements bear like reference numerals and wherein.

DETAILED DESCRIPTION OF PREFERRED EMBODIMENTS OF THE INVENTION

Hereinafter, a preferable embodiment of a passive mode lock fiber laser according to a present invention will be described referring to FIGS. 1–5. At first, the passive mode lock fiber laser according to a first embodiment will be described by using FIG. 1.

Figure 1:
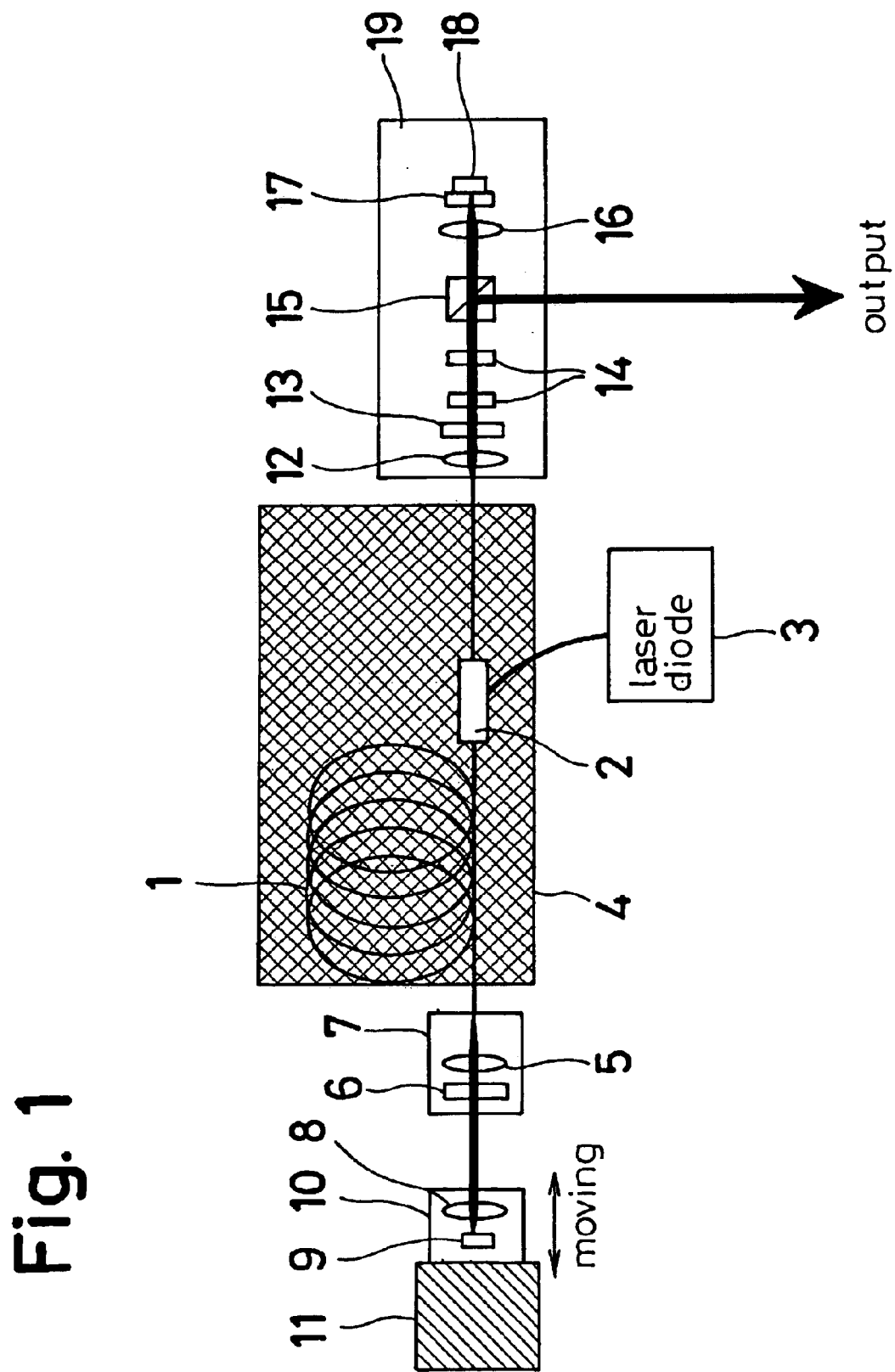
FIG. 1 is a block diagram showing a passive mode lock fiver laser according to a first embodiment of a present invention.

In FIG. 1, laser energy (e.g. light with wave length λ=980 nm) generated by a laser diode 3 (energy generating means) is leaded to a wave distributor 2 (WDM), then the laser energy is leaded into a cavity (between two minors) of which has one end defined by a, mirror 9 (reflect means) and another end defined by a mirror 18 (reflect means). As to the cavity, a major part of a cavity length is consisted of an erbium dope fiber 1 (gain medium).

The erbium dope fiber 1 is a species of optical fibers made of luminescent materials, which is able to amplify the laser energy shuttling in the cavity. Further, a part of the erbium dope fiber 1 is several times wound at a wound portion of the erbium dope fiber 1, the erbium dope fiber 1 including the wound portion is disposed on a metal plate 4 (thickness: 10 mm) given nickel coat on a cupper plate, and which is fixed with the metal plate 4.

Peltier element (temperature adjusting mechanism, PSR-BV α 248-12 made by Aisin Seiki Co., not shown) is disposed under the metal plate 4. The metal plate 4, the Peltier element, the erbium dope fiber 1, and the laser diode 3 or the like are covered by heat insulating materials (thickness: 10 mm) and which is insulated from outside air. The Peltier element for adjusting a temperature of the erbium dope fiber 1 is provided, for example, a set temperature (a predetermined adjusting temperature) is set at a closed temperature for a room temperature. In the present embodiment, as heat generating by the Peltier element is leaded to the erbium dope fiber 1 via the metal plate 4, the metal plate 4 with high heat conductivity is disposed in a heat channel, homogeneous heat is transmitted by the erbium dope fiver 1.

A construction at a left side portion in FIG. 1 of the erbium dope fiber 1 composing the major parts of the cavity length in the cavity will be described hereinafter. A lens 5 and a Faraday rotator 6 (phase fluctuation compensating means) are disposed on a member 7 at vicinity of a left end portion of the erbium dope fiber 1 in FIG. 1. In this construction, the Faraday rotator 6 is disposed at left side for the lens 7 in FIG. 1. The lens 5 changes light diffused and threw out from a left end portion of the erbium dope fiver 1 in FIG. 1 to parallel light, the lens 5 leads the parallel light to the Faraday rotator 6. To the contrary, the lens 5 focuses light threw out from a Faraday rotator side, the lens 5 leads the focused light to the left end portion of the erbium dope fiber 1 in FIG. 1. Further, the Faraday rotator 6 includes a rotatable deflection surface, light is deflected 45° by passing through the Faraday rotator 6. As to the Faraday rotator 6, a stable liner phase delay can be obtained between two deflection inherence modes interposed by propagating into the erbium dope fiber 1 by associating with after-mentioned another Faraday rotator 13, thereby a stable mode lock condition of the passive mode lock fiber laser is able to be held against the environment temperature change.

In the cavity at a further left side portion for the member 7 as shown in FIG. 1, a lens 8 and a mirror 9 are disposed on a member 10, herein the mirror 9 is disposed at the left side for the lens 8. The lens 8 focuses parallel light threw out from the Faraday rotator 6. To the contrary, the lens 8 leads the parallel light to the mirror 9. To the contrary, the lens 8 changes light reflected and diffused from the mirror 9 to parallel light, and the lens 8 leads the parallel light to the Faraday rotator 6. Further, the mirror 9 is the reflect means of light composing the end portion of the cavity, the mirror 9 may be used a metal mirror or the mirror may be made by dielectric multiple layer.

The member 10 contacts with piezo element 11 (piezo element position adjusting mechanism), which is made by Pickelmann Co. at a left end shown in FIG. 1. A position of the optical axis direction of the mirror 9 and the lens 8 disposed on the member 10 is finely adjusted by the piezo element 11. Herein, the piezo element 11 has a characteristic which moves by 25 μm when the driving voltage (e.g. 150 V) is supplied.

Then, a construction of a right side portion shown in FIG. 1 of the erbium dope fiber 1 constituting major parts of the cavity length in the cavity will be described hereinafter. A lens 12, a Faraday rotator 13 (phase fluctuation compensating means), two wave length plates 14 (output means), a deflection beam splitter cube 15 (output means), a lens 16, a saturable absorber 17, and a mirror 18 are disposed in tern on the member 19 at vicinity of the right end portion of the erbium dope fiber 1 shown in FIG. 1. The lenses 12, 16 correspond to the above mentioned lenses 5, 8, these lenses have same functions. Further, the Faraday rotator 13 associates with another Faraday rotator 6, a stable liner phase delay can be obtained between two deflection inherence modes interposed by propagating into the erbium dope fiber 1. The saturable absorber 17 can be start a mode lock condition and held the mode lock condition by using saturable characteristic of light having a material composing the saturable absober17. Two wave plates 14 and the deflection beam splitter cube 15 comprise the output means of the present laser, which output to the outside by adjusting fitly laser energy generated and shuttling in the cavity. For example, the outputted laser light by the deflection beam splitter has a characteristic (of which the wave length: 1558 nm, the repetition frequency: 50 MHz, the pulse width: 500 femto second, and the output power: 5 nm). The mirror 18 is the reflect means of light comprising an end portion of the cavity, the mirror 18 may be used the metal mirror or the dielectric multiplayer film as well as the mirror 9.

At first, when the driving voltage is not supplied for the piezo element 11 under a condition of which a mirror position of the mirror 9 in the optical direction is fixed, the erbium dope fiber 1 is adjusted by 25° C. by the Peltier element, the fluctuation of the repetition frequency for the environment temperature change (outside temperature change) was measured so as to confirm a stability of the repetition frequency against the environment temperature change of the passive mode lock fiber laser according to the first embodiment in the above-mentioned present invention.

Figure 2:
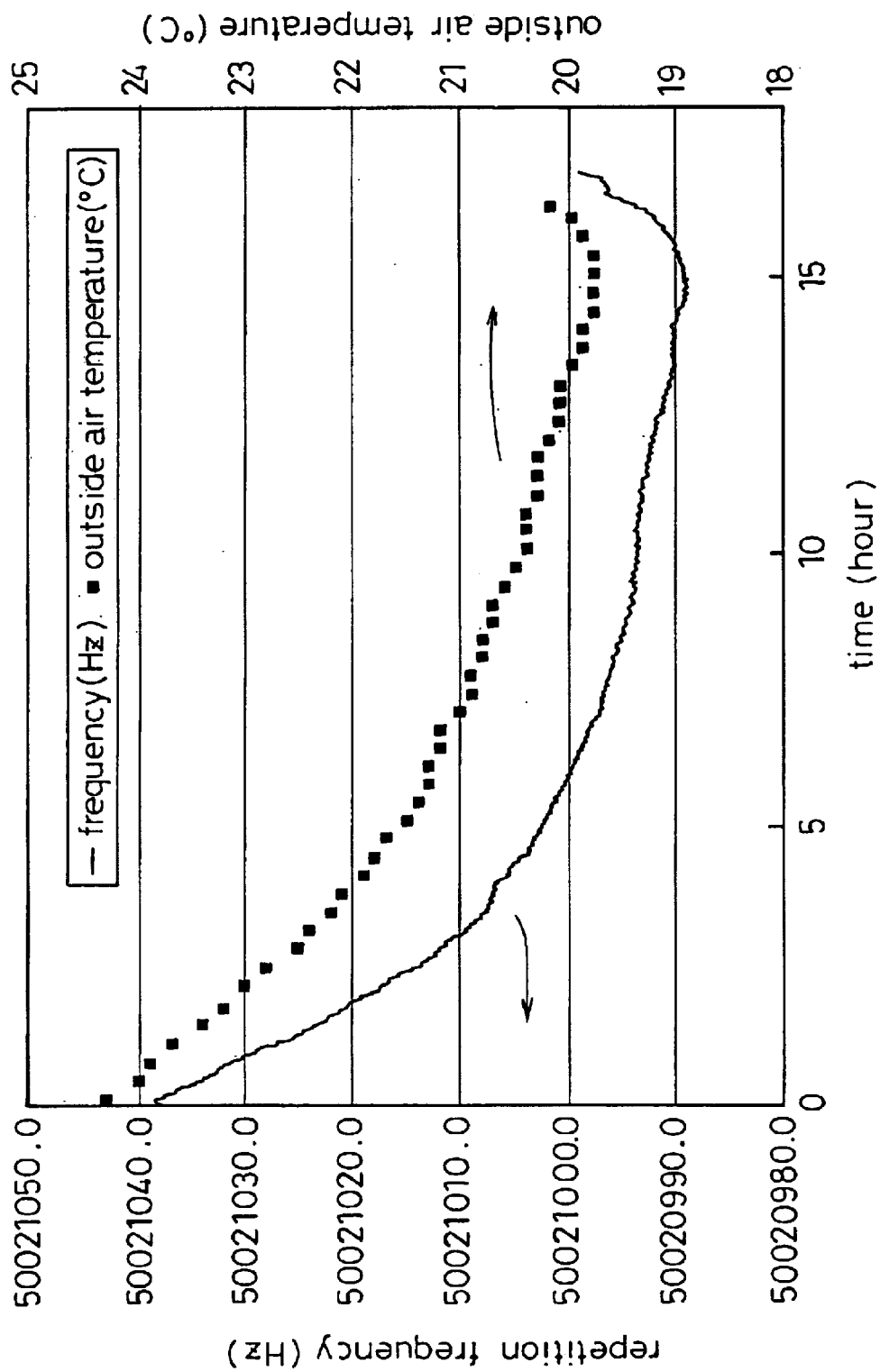
FIG. 2 is a graph showing measured fluctuations of the repetition frequency against environment temperature change (a change of outer temperature) when a temperature of erbium dope fiber is adjusted by 25° C. under a condition of which a driving voltage is not supplied for piezo element according to the first embodiment of a present invention.

Consequently, FIG. 2 indicates the result. In FIG. 2, abscissa axis shows time (hour) and ordinate axis shows repetition frequency (Hz) and outdoor air temperature (°C.). The measured result shown in FIG. 2 shows a decreasing effect on the fluctuation width of the repetition fluctuation by only temperature adjusting effect based on the Peltier element (temperature adjusting mechanism) in the run-up to fine adjust the cavity length by the piezo element 11.

According to the measured result shown in FIG. 2, FIG. 2 shows that the repetition frequency fluctuates only to 50 Hz when the outside temperature fluctuates about 5° C. The fluctuation (50 Hz) is based on expansion and contraction caused by the temperature fluctuation of which temperature adjustment is not able to be established by the Pertier element on a portion consisting of the erbium dope fiber 1, and the fluctuation is based on the fluctuation of the cavity length caused by expansion and contraction by temperature change of a portion except the above mentioned portion in the cavity. Compared with the result, which the repetition frequency changes by 3 KHz when the room temperature changes by 7° C., shown in FIG. 5, the fluctuation afforded for the repetition frequency by a temperature change of the outside temperature can be drastically reduced.

Figure 3:
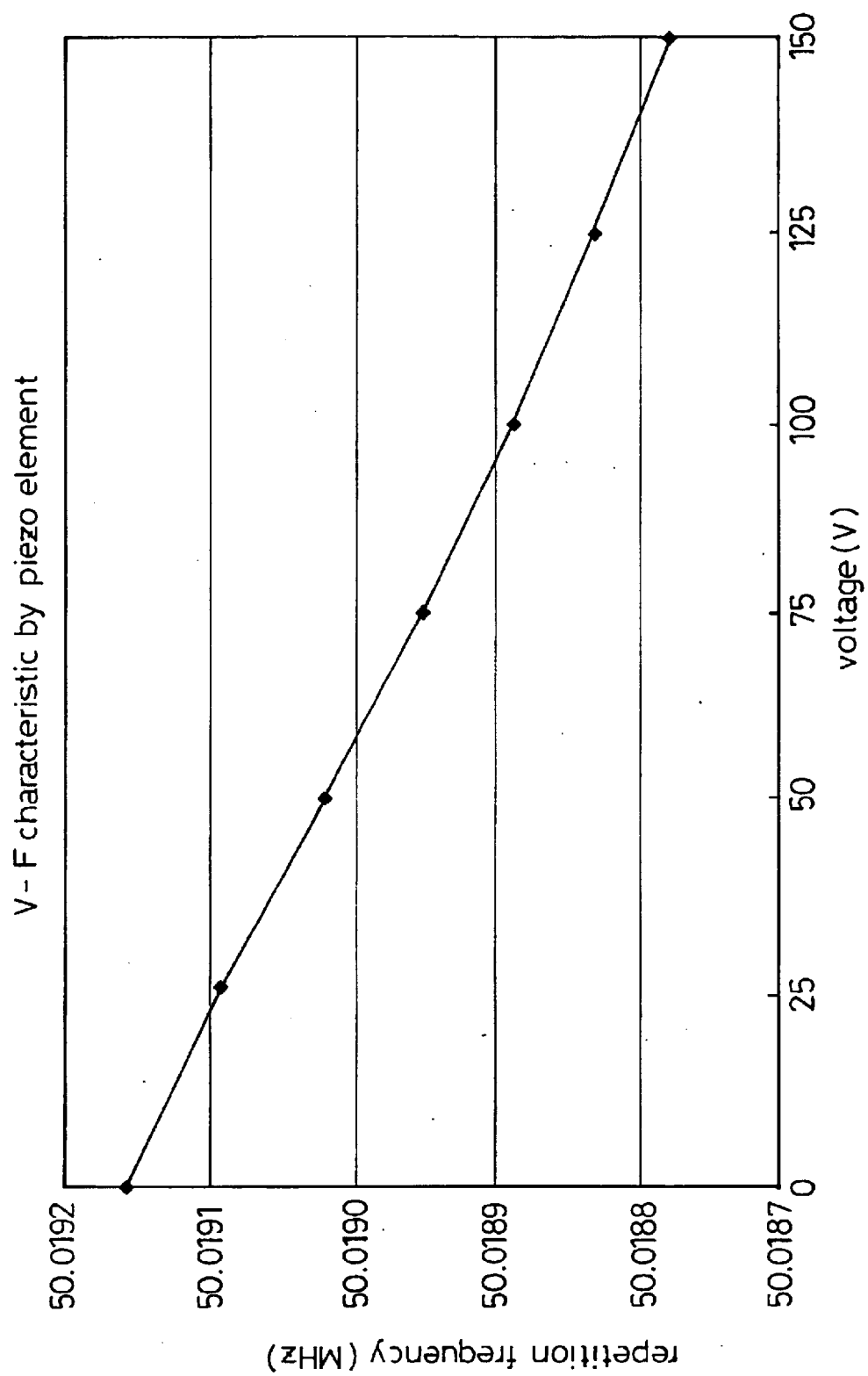
FIG. 3 is a graph showing a measured result for a change of the repletion frequency when the driving voltage (0–150 V) is supplied for the piezo element according to the first embodiment of a present invention.

As the above-mentioned, a movable range of the piezo element 11 is 25 $\mu$m. Conceptually, according to the calculation formula shown in the column of issue, the piezo element 11 can be vary about 420 Hz for the repetition frequency. Accordingly, it is able to generate the requested repetition frequency under the stable condition by controlling the piezo element 11 and finely adjusting the cavity length for the fluctuation (50 Hz) of the repetition frequency shown in FIG. 2. Actually, FIG. 3 shows a change of the repetition frequency when a voltage (0–150 V) is supplied to the piezo element 11. As shown in FIG. 3, when a voltage (0–150 V) is supplied to the piezo element 11, the repetition frequency changes about 400 Hz closing to the above-mentioned theory value (about 420 Hz). Further, actually, by using the present laser, stability on the repletion frequency of the laser light is tried by controlling the piezo element 11 by using a feedback electronic circuit (not shown) under a condition measuring the repetition frequency of the laser light, thereby the laser light with the repetition frequency (50.02112 MHz) can be generated.

Further, in the above-mentioned embodiment, the Peltier element such as the temperature adjusting mechanism is used, the temperature adjusting mechanism may be used known heater. Using the heater, when the erbium dope fiber 1 is adjusted by 35° C. over the room temperature via the metal plate 4, the feedback electronic circuit (not shown) make control the piezo element 11 and stability of the repetition frequency of the laser light is tried, thereby the laser light results in a constant repetition frequency (e.g. 50.02112 MHz).

Above all things, the construction about the passive mode lock fiber laser according to the first embodiment in the present invention is explained. Next, referred to FIG. 4, a construction about a passive mode lock fiber laser according to a second embodiment in the present invention will be explained hereinafter. In this embodiment shown in FIG. 4, same construction elements shown in FIG. 1 uses same numeral as FIG. 1, the explanation will be omitted.

Figure 4:
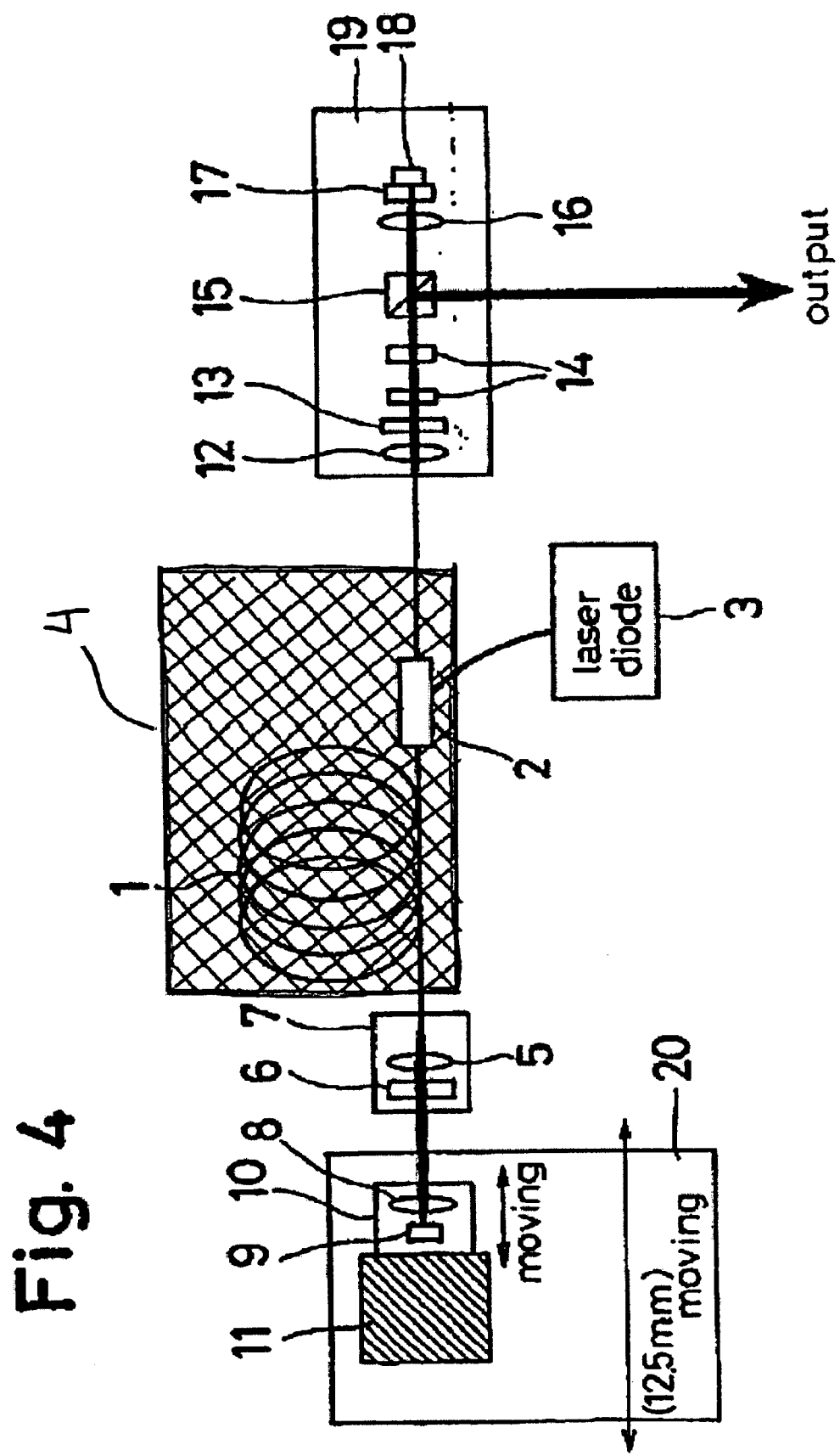
FIG. 4 is a block diagram showing a passive mode lock fiver laser according to a second embodiment of a present invention.
Figure 5:
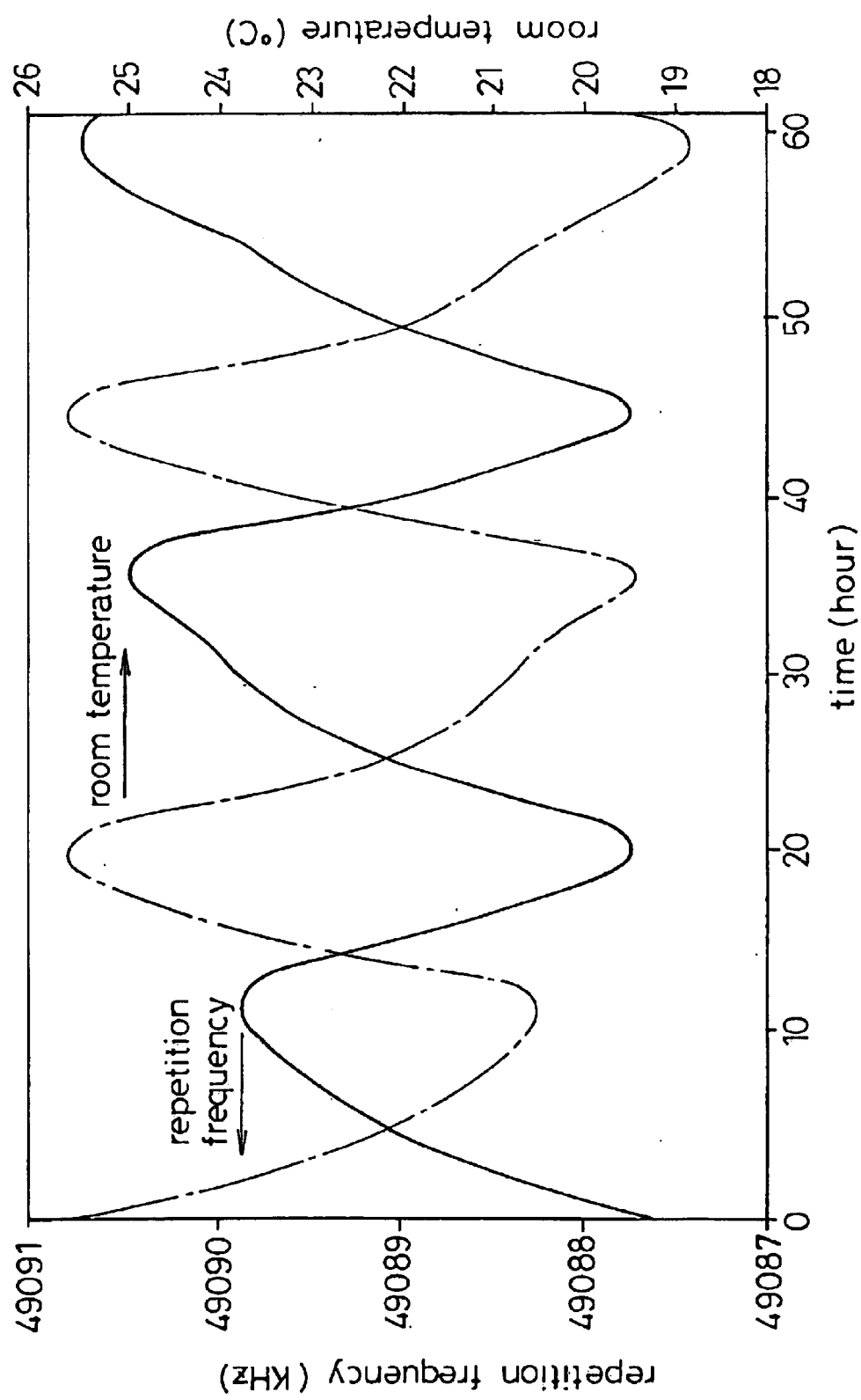
FIG. 5 is a graph showing a measured result of a temporal transition of the repetition frequency fluctuation under environment in general laboratory when the repetition frequency is adjusted about 50 MHz for a passive mode lock fiber laser in prior art.

In the second embodiment of the present invention, different points between the first embodiment shown in FIG. 1 and the second embodiment shown in FIG. 4 does not include the temperature adjusting mechanism (the Peltier element, the heater, the metal plate, 4, and the heal insulating material etc.) for rough adjusting the cavity length shown in the first embodiment, but the second embodiment includes a mechanical position adjusting mechanism for rough adjusting the cavity length. The mechanical position adjusting mechanism comprises a member 10 mounting a lens, 8 and a mirror 9, and a straight moving stage 20 (corresponding to a moving member, one axis straight moving stage M-423, and a precision actuator CMA-12CCCL) made by Newport Co. including a piezo element 11 contacting with the member 10, which is movable 12.5 mm in the optical axis. Accordingly, a position in the optical axis of the lens 8 is changed by controlling a position in the optical axis direction of the straight stage, thereby it can be adjust the cavity length. Further, the piezo element 11 the second embodiment is same as the piezo element shown in the first embodiment.

Hereupon, the adjustable width of the repetition frequency corresponding to the movable area (12.5 mm) of the cavity length results in theoretically about 2 KHz according to the calculation formula shown in issue for solving the problem shown in the prior art. According to the data shown in FIG. 5, the construction shown in the second embodiment can be absorb the frequency fluctuation caused by the environment temperature change (about 4° C.) by using the present laser. Actually, if the feedback electronic circuit (not shown) makes control the piezo element 11 by using the present laser, the stability for the repetition frequency of the laser light is improved. As a result, it can be generate the laser light with the repetition frequency (e.g. 48.87200 MHz).

In the second embodiment shown in FIG. 4 in the present invention, as the moving area of the straight moving stage 20 is 12.5 mm, it can be only absorb the fluctuation of the repetition frequency caused by the environment temperature change (about 4° C.). However, it is easy to derive for one of ordinary skill in the art what the fluctuation of the repetition frequency caused by the environment temperature change (about 8° C.) can be absorb by using the straight moving stage moving the movable area (25 mm). Further, if the member 10 with the mirror 9 and the piezo element 11 are detached from the straight moving stage 26 in FIG. 4, and a retro reflector is disposed at adequate portion in the cavity, and the retro reflector is mounted on the straight moving stage 20, thereby change of the cavity length of a twice moving distance of the straight stage 20 can be obtain. Accordingly, it is easy for the one of ordinary skill in the art to come up with what it can be absorb the fluctuation of the repetition frequency caused by the environment temperature change (about 16° C.) if the retro reflector is mounted on the straight stage (movable area: 25 mm).

Further, both the above mentioned the temperature adjusting mechanism shown in the first embodiment in the present invention and the mechanical position adjusting mechanism shown in the second embodiment may be use. Thereby even if an accuracy of the temperature adjustment of the temperature adjusting mechanism is comes down, increasing parts of a fluctuation width by the environment temperature change of the cavity length can be absorbed by the mechanical position adjusting mechanism. Moreover, using both the temperature adjusting mechanism and the mechanical position adjusting mechanism, after experiment or examination etc. is started, a time till stabilizing a temperature of the optical fiber etc. by the temperature adjusting mechanism is shorten. Thereby it can be short time spent an experiment etc. As this like, if the temperature adjusting mechanism and the mechanical position mechanism are used, it can be efficiently generate the laser light with the requested repetition frequency.

According to the present invention, as the above mentioned, the mode lock condition is able to be held under stable condition against the environment temperature change and it is able to be provided the passive mode lock fiber laser which the adjustment of the repetition frequency is easy under the condition of which the environment temperature change is large. Further, when an experiment or measurement is executed by using a light oscilloscope or another measuring device, if the passive mode lock fiber laser according to the present invention is used, it can be generated the laser light with a voluntary repetition frequency demanded from other measuring device under stable condition, and it is easy to synchronize an output timing of the light pulse at timing of which other measuring device demands.

The invention may be embodied in other specific forms without departing from the spirit or essential characteristic thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A passive mode lock fiber laser including an energy generating means for generating a laser energy with a cavity including a gain medium made of an optical fiber for amplifying the laser energy in the cavity, a pair of reflect means for reflecting the laser energy along an optical axis passing through the gain medium, a phase fluctuation compensating means for compensating a linear phase fluctuation of the gain medium, and an output means for outputting the laser energy generated in the cavity comprising:

a temperature adjusting mechanism for adjusting a temperature of an optical fiber, the temperature adjusting mechanism being disposed proximate the optical fiber; and a piezo element position adjusting mechanism for adjusting a position in the optical axis of at least one of the reflect means by using a piezo element which is operable to contact one of the reflect means; and a moving stage operably attached to the reflect means and the piezo element position adjusting mechanism, the moving stage being movable in the optical axis.

2. A passive mode locked fiber laser according to claim 1, wherein the temperature adjusting mechanism includes at least a heater disposed proximate the optical fiber.

3. A passive mode lock fiber laser according to claim 1, wherein the temperature adjusting mechanism includes at least Peltier element disposed at a vicinity of the optical fiber.

4. A passive mode locked laser according to claim 1, wherein the optical fiber is not polarization maintaining fiber, and the phase fluctuation compensating means comprises a pair of Faraday rotators.

5. A passive mode locked fiber laser according to claim 1, wherein said moving stage compensates for cavity length fluctuations for which said temperature adjusting mechanism does not compensate.

* * * * *